Oct. 29, 1968 H. S. CLARKE 3,407,918
APPARATUS FOR BREAKING UP AND CONVEYING
FIBROUS TEXTILE MATERIALS
Filed Dec. 22, 1966 5 Sheets-Sheet 3

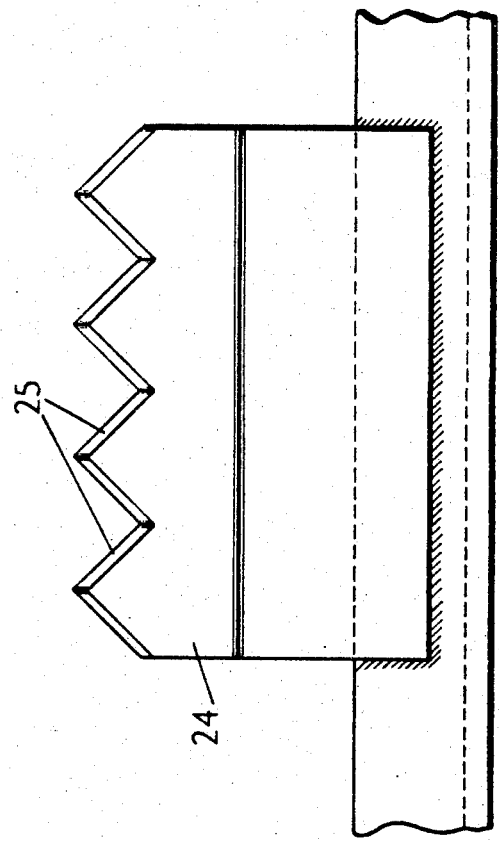
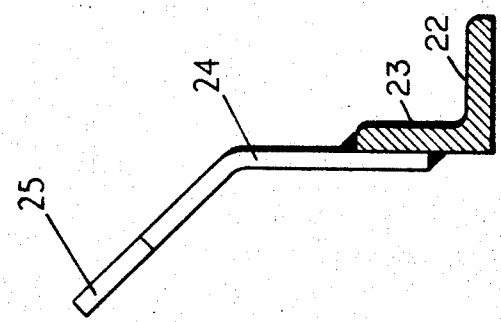

United States Patent Office 3,407,918
Patented Oct. 29, 1968

3,407,918
APPARATUS FOR BREAKING UP AND CONVEYING FIBROUS TEXTILE MATERIALS
Hubert Samuel Clarke, Bamford, Rochdale, England, assignor to The Patent Automatic Feeding Machine Company Limited, Rochdale, Lancashire, England, a British company
Filed Dec. 22, 1966, Ser. No. 604,011
Claims priority, application Great Britain, Jan. 27, 1966, 3,654/66
6 Claims. (Cl. 198—102)

ABSTRACT OF THE DISCLOSURE

This invention relates to apparatus for breaking up large compact masses of fibrous textile materials, i.e. dye cakes of synthetic fibres, into conveyable quantities of fibres in a loose state, and conveying same. The apparatus is composed of a feed conveyor, a hopper or delivery chute, and intermediate the feed conveyor and hopper or chute is an inclined lattice. Some of the laths of the lattice have claws attached to them, and each claw has teeth on its free edge. The claws are arranged in a staggered relationship with respect to the immediately adjacent claws so that the claws are disposed on oblique lines running longitudinal the lattice. These staggered claws successively attack and break up a large compact mass of fibrous textile material into conveyable quantities and convey these quantities to the hopper or chute.

---

This invention relates to hopper feeding machines as used for feeding textile materials to other appliances such as for example drying machines.

When such hopper feeders are used for dealing with dye cakes, especially of synthetic fibres, difficulties arise because the dye cakes are very compact and cannot readily be disintegrated by the spiked lattice of the hopper feeder. The object of the invention is to provide reliable means for breaking up or pulling apart a compact mass of fibres into a state in which it can be readily handled by the normal spiked lattice.

According to the invention we provide an inclined lattice having claws arranged along oblique lines, disposed between a conveyor for fibrous materials and a hopper or delivery chute, for the purpose of breaking up masses of fibres on the conveyor and delivering the fibres in a loose state to the hopper.

The equipment may comprise a horizontal lattice conveyor on which fibrous materials such as dye cakes can be deposited. At the delivery end of the conveyor is the clawed conveyor lattice which is inclined at an angle of for example 70° to the horizontal and slopes upwardly away from the conveyor. Beyond the clawed lattice is the hopper into which the material falls as it comes over the top of the lattice. The fibrous material fed into the hopper is in a loose state in which it can conveniently be handled by the usual spiked lattice.

The clawed lattice has claws secured to some of its slats, each group of claws being staggered with respect to the adjacent groups, so that claws are disposed on oblique lines longitudinally of the lattice. The claws may consist of steel plates each having pointed fingers on its free edge, the plates being bent in the direction of travel.

Figure 1:
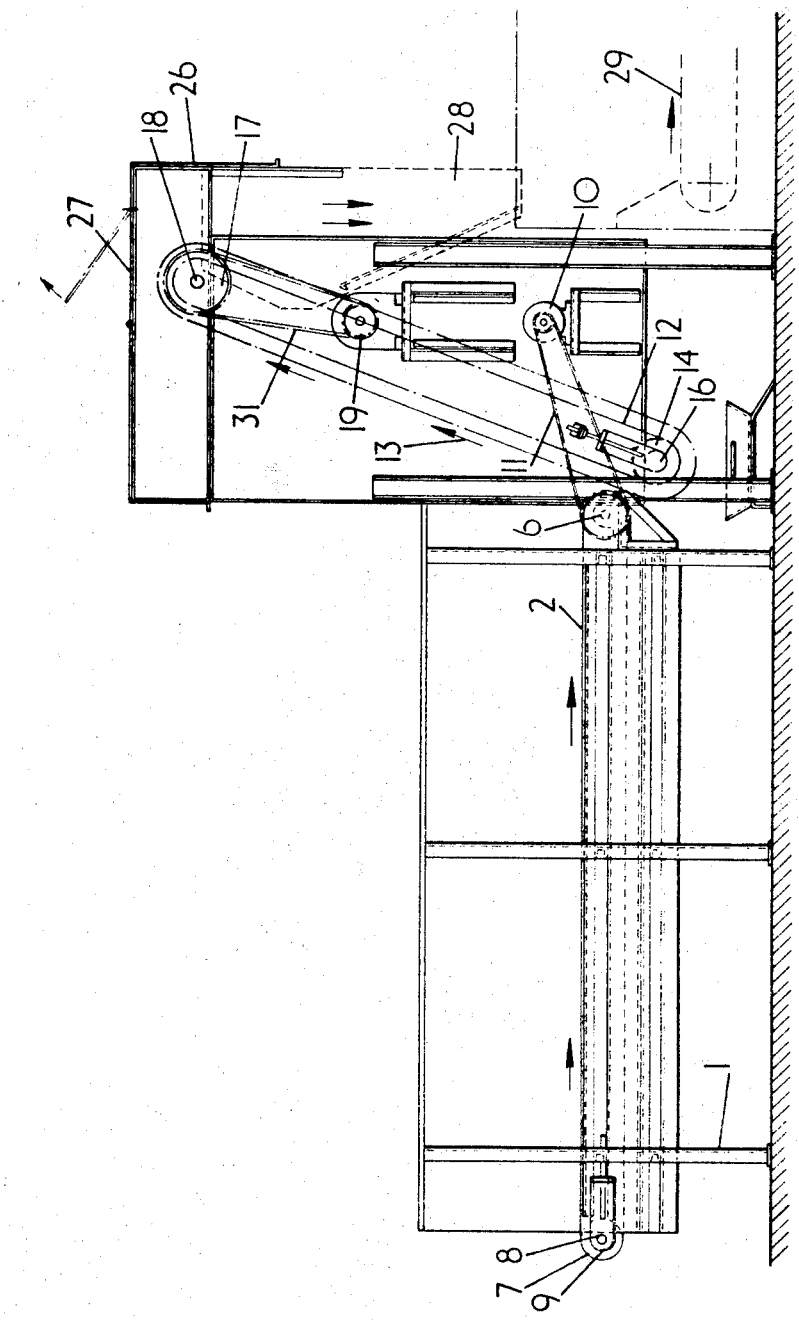
Figure 2:
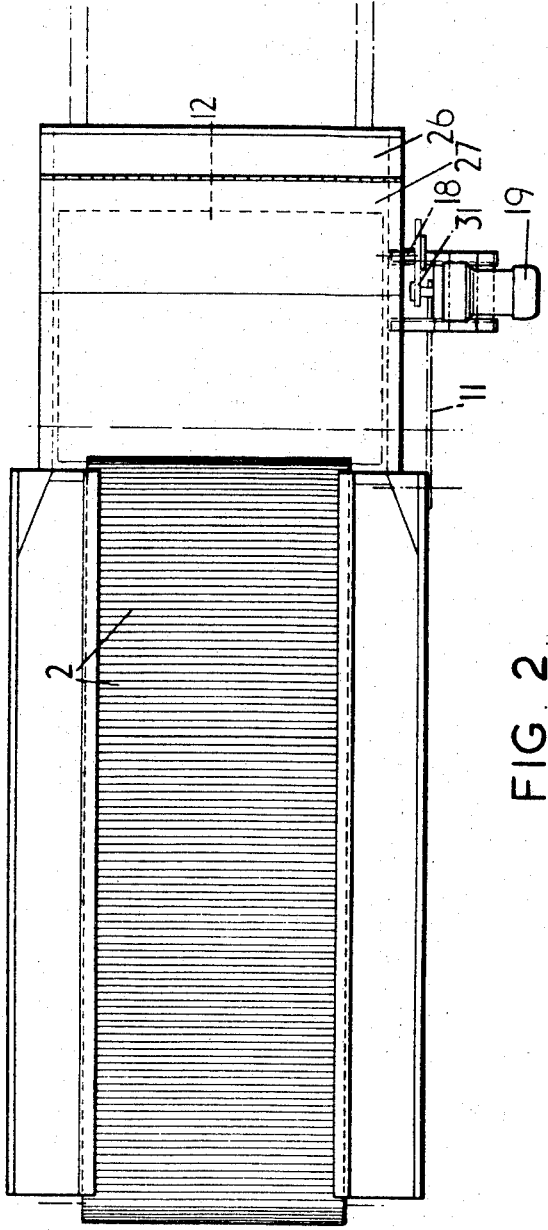
Figure 3:
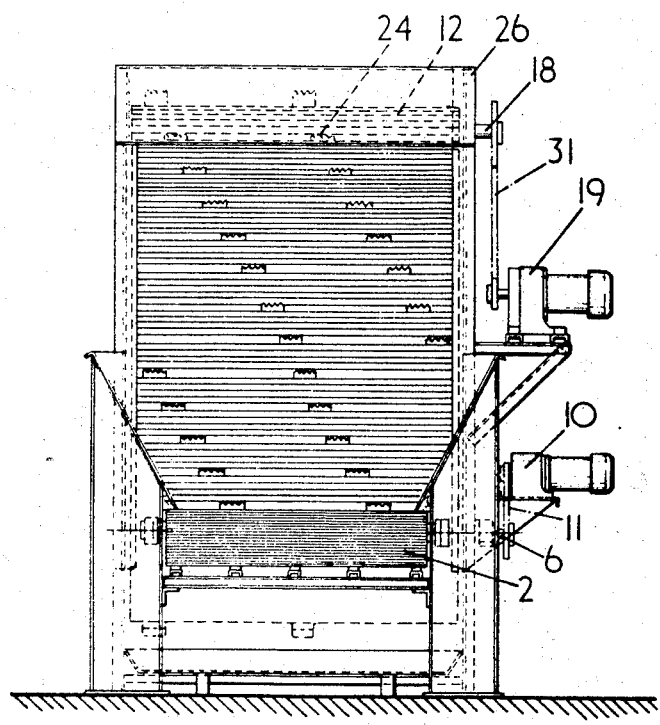
Figure 4:
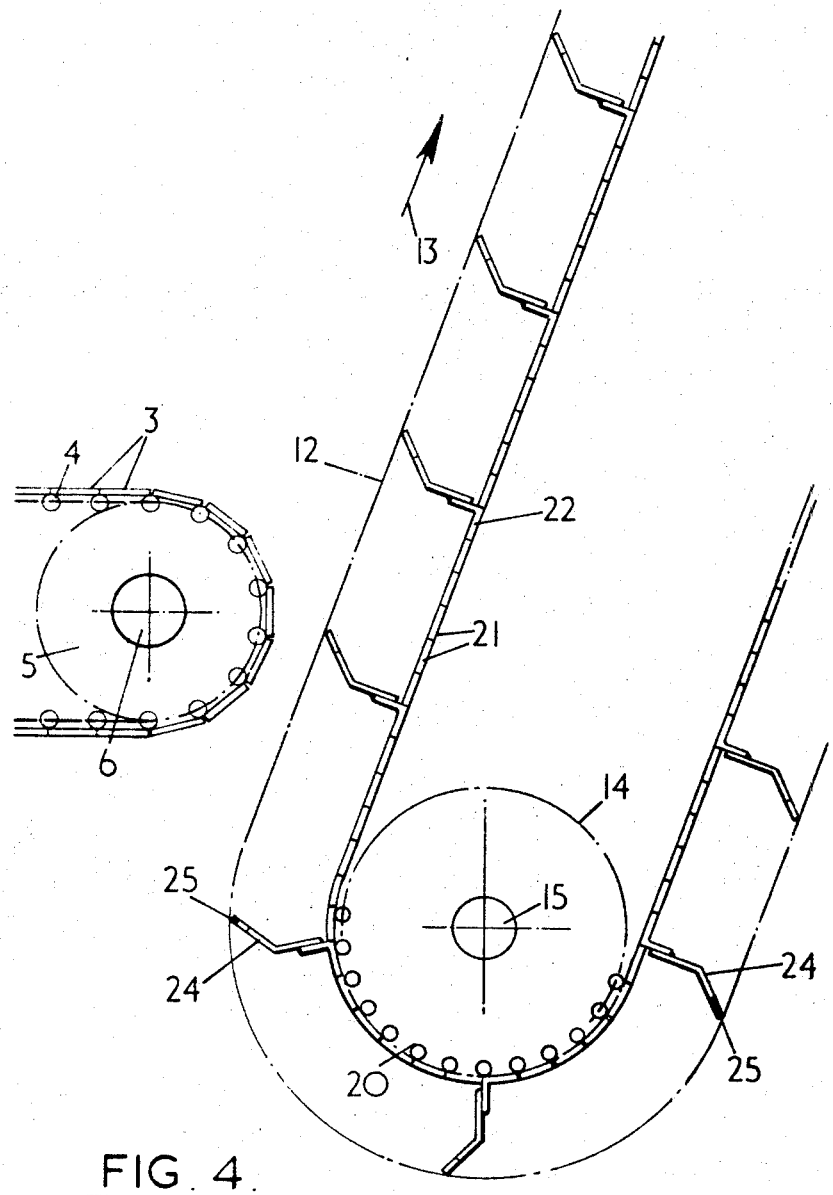

FIG. 1 shows in side elevation an arrangement according to the invention for conveying and breaking dye cakes;
FIG. 2 is a plan;
FIG. 3 is an end elevation;
FIG. 4 is a side view showing parts of the horizontal and inclined lattices on a larger scale;
FIG. 5 is a section of an angle lath with claw;
FIG. 6 is a front view of a claw.

The equipment illustrated comprises a frame 1 supporting a horizontal lattice conveyor 2 consisting of plain laths 3 carried by chains 4 travelling round sprockets 5 on a driven front shaft 6 and sprockets 7 on a trailing shaft 8 mounted in adjustable bearings 9. The shaft 6 is driven by a motor 10 and chain 11.

In front of the front end of the conveyor 2, there is an inclined lattice 12, which travels in the direction of the arrow 13 around sprockets 14 on a shaft 15 mounted in adjustable bearings 16, below the level of the conveyor 2. The lattice 12 at its upper end travels round sprockets 17 on a shaft 18 driven by a motor 19.

The lattice 12 consists of chains 20 carrying plain laths 21, and angle laths 22 spaced at regular intervals. As shown in FIG. 4, every sixth lath is in angle lath with its web 23 directed outwards. To the webs 23 are welded claws 24, bent forwards in the direction of travel and formed with teeth 25 on their free edges. Each angle lath carries two claws, and the claws of successive angle laths are offset so that the centres of the claws lie on lines inclined with respect to the edges of the inclined lattice, as shown in FIG. 3.

The upper end of the lattice 12 is enclosed in a casing 26, with a hinged access panel 27 at the top. The front part of the casing 26 forms a hopper or delivery chute 28, through which material carried by the lattice 12 drops to a conveyor 29 to take it away for further treatment.

The motor 19 is a geared motor to provide a convenient speed for the lattice 12 in conjunction with the chain drive 31 to the shaft 18. The motor 10 is a geared motor with speed control unit to provide a variable slow speed for the lattice conveyor 2 so that it can move material forward at a speed to match the rate at which the claws will remove or scavenge fibre from the dye cake.

In operation, dye cakes consisting of compact fibrous material coming from the dyeing equipment are placed on the lattice conveyor 2 which carries them up to the inclined lattice 12. The claws of the lattice 12 effectively break up the compact mass of fibres and carry the material upwards in a loosened state and discharge it through the chute 28 in a condition in which it can readily be dealt with by an ordinary spiked lattice for feeding it to appliances such as drying machines. It has been found that the inclined clawed lattice is able to deal with dye cakes of synthetic fibres however dense they may be, which cannot be broken up at all by normal spiked lattices.

What is claimed is:
1. Apparatus for breaking up large compact masses of fibrous textile materials into conveyable quantities and conveying said quantities comprising a feed conveyor for said large masses of fibrous materials, a hopper or delivery chute, an inclined lattice disposed between said conveyor and said hopper or delivery chute, and claws secured to some of the laths of the lattice, each claw having teeth and being staggered with respect to adjacent claws on other laths, so that the claws are disposed on oblique lines longitudinally of the lattice for the purpose of breaking up said large compact masses of fibres and conveying said conveyable quantities of the fibres in a loose state to said hopper or chute.

2. Apparatus as claimed in claim 1, in which the conveyor is a horizontal conveying lattice onto which said large compact masses of fibrous textile material can be placed.

3. Apparatus as claimed in claim 2, in which the inclined lattice is disposed with its lower end below the delivery end of the horizontal lattice.

4. Apparatus as claimed in claim 1, in which the inclined lattice is inclined at an angle of about 70° to the horizontal.

5. Apparatus as claimed in claim 1, in which the inclined lattice has chains carrying plain laths and angle laths spaced at regular intervals, the angled laths having said claws welded to them.

6. Apparatus as claimed in claim 1, in which said claws consist of steel plates each having teeth on its free edge, the plates being bent in their direction of travel.

References Cited

UNITED STATES PATENTS

| 1,969,613 | 8/1934 | Kerst | 198—229 |
| 3,326,351 | 6/1967 | Ross | 198—30 |

RICHARD E. AEGERTER, *Primary Examiner.*